US009026950B2

(12) United States Patent  
Eltoft

(10) Patent No.: US 9,026,950 B2  
(45) Date of Patent: May 5, 2015

(54) GESTURE-ENABLED SETTINGS

(75) Inventor: Justin D Eltoft, Pleasant Prairie, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 244 days.

(21) Appl. No.: 13/228,133

(22) Filed: Sep. 8, 2011

(65) Prior Publication Data

US 2013/0067419 A1    Mar. 14, 2013

(51) Int. Cl.
*G06F 3/033* (2013.01)
*G06F 3/048* (2013.01)
*G06F 3/0488* (2013.01)
*G06F 3/0484* (2013.01)

(52) U.S. Cl.
CPC ........ *G06F 3/04883* (2013.01); *G06F 3/04847* (2013.01)

(58) Field of Classification Search
USPC .......................................................... 715/863
See application file for complete search history.

(56) References Cited

U.S. PATENT DOCUMENTS

| | | | |
|---|---|---|---|
| 2006/0085767 A1* | 4/2006 | Hinckley et al. | 715/863 |
| 2007/0245254 A1 | 10/2007 | Kwon et al. | |
| 2008/0019591 A1 | 1/2008 | Iwayama et al. | |
| 2008/0186808 A1* | 8/2008 | Lee | 368/10 |
| 2009/0160778 A1 | 6/2009 | Nurmi et al. | |
| 2011/0010626 A1 | 1/2011 | Fino et al. | |
| 2011/0167360 A1* | 7/2011 | Aitken et al. | 715/760 |
| 2012/0013552 A1 | 1/2012 | Ahn | |
| 2012/0151400 A1* | 6/2012 | Hong et al. | 715/769 |

FOREIGN PATENT DOCUMENTS

| | | |
|---|---|---|
| EP | 1956446 B1 | 12/2011 |
| WO | 2007012698 A1 | 2/2007 |

OTHER PUBLICATIONS

Preston Gralla: "Driod X: The Missing Manual" in: "Droid X: The Missing Manual", Feb. 1, 2011, O'Reilly Media, Inc ISBN: 978-144-939386-1.*
Patent Cooperation Treaty, "PCT Search Report and Written Opinion of the International Searching Authority" for International Application No. PCT/US2012/052601, Nov. 2, 2012, 17 pages.
Preston Gralla, "Droid X: The Missing Manual", Feb. 1, 2011, 128 pages, O'Reilly Media, Inc., Sebastopol, CA.
David Pogue, "iPhone: The Missing Manual, Fourth Edition", Aug. 24, 2010, 52 pages, O'Reilly Media, Inc., Sebastopol, CA.
Wikipedia, "Software Widget", http://web.archive.org/web/28181812825117/http://en.wikipedia.org/wiki/Software_widget (retrieved on Oct. 25, 2012), Oct. 12, 2010, 4 pages.
The Trustees of Indiana University, "Knowledge Base: In Microsoft Windows, how do I modify the screen saver settings?", http://kb.iu.edu/data/afbu.html. Jul. 30, 2010, 1 page.

(Continued)

*Primary Examiner* — Peiyong Weng
(74) *Attorney, Agent, or Firm* — Shumaker &Sieffert, P.A.

(57) ABSTRACT

Techniques (200) and apparatuses (102, 800) for gesture-enabled settings are described. In some embodiments, a gesture manager (112) is configured to enable selection (202) to enter a settings mode during presentation of a user interface (120), responsive to selection indicate (204) that the user interface is in the settings mode, enable (206) selection to alter a setting through a gesture made to a label in the user interface, and alter (210) the setting responsive to the selection.

18 Claims, 8 Drawing Sheets

(56) References Cited

OTHER PUBLICATIONS

Heinz Tschabitscher, "How to Change the New Mail Sound in Outlook, Windows Mail and Outlook Express", About.com, http://email.about.com/od/outlooktips/qt/Change_the_New_Mail_Sound_in_Outlook_Windows_Live_Mail.htm, Sep. 7, 2011, 1 page.

Heinz Tschabitscher. "How to Find Your Live Mail or Outlook Express Settings in WIndows's Registry", About.com, http://email.about.com/od/outlookexpresstroubles/qt/Find_Your_Live_Mail_or_Outlook_Express_Settings_in_Registry.htm, Sep. 7, 2011, 1 page.

* cited by examiner

GESTURE-ENABLED SETTINGS

BACKGROUND

Current techniques for altering settings on a computer can be cumbersome. Users wishing to alter a setting often begin at a home screen, then select another screen or toolbar having various selectable icons, find an icon associated with settings, tools, or options, select that icon to bring up another screen, and then search through this third screen to find the desired setting to alter. Sometimes, simply getting to this final settings screen is cumbersome. Further, finding the desired setting within a settings screen can itself be cumbersome, as it may require searching through many entries for different applications or functions of the computer associated with the setting.

BRIEF DESCRIPTION OF THE DRAWINGS

Techniques and apparatuses for gesture-enabled settings are described with reference to the following drawings. The same numbers are used throughout the drawings to reference like features and components.

DETAILED DESCRIPTION

Current techniques for altering settings on a computing device are often cumbersome, which may make finding and altering settings confusing, difficult, or time-consuming This disclosure describes techniques and apparatuses for gesture-enabled settings, which often permit users to more-easily or more-quickly alter settings on their computers.

By way of example, in one embodiment a method is described that enables a user-selection, on a gesture-sensitive display of a user interface having multiple labels representing multiple applications, to direct an electronic device to enter a settings mode. This method, responsive to receiving the user-selection to enter the settings mode, indicates that the user interface is in the settings mode without altering a layout of the multiple labels. The method then enables selection of a particular label, through the gesture-sensitive display, of one of the multiple labels using a gesture and, responsive to receiving the gesture, alters a setting for an application associated with the selected label.

In another embodiment, a method enables a non-simple gesture-selection received substantially over or around a label to alter a setting of an application of an electronic device, where the application is identified via the label on a user interface that presents multiple labels for multiple respective applications. Responsive to the non-simple gesture-selection, the method presents a submenu in the user interface that enables user-selection to alter the setting of the application of the label or alters the setting of the application represented by the label.

In these and other embodiments, the techniques and apparatuses may indicate that a setting can altered, such as through submenus, partially transparent watermarking of labels, background/wallpaper indications, or replacement of labels with watermarked versions. Further, various types of simple and non-simple gestures may be used, such as through circular or double back-and-forth gestures, to name just two.

When an embodiment is implemented using a "home" screen of an electronic device, the settings mode can enable quick alteration of settings of frequently-used applications and files. This is because users generally place labels for frequently-used functions, applications, and files on their home screens. Note that not all labels of a home screen (or other user interface screen) in a settings mode may allow setting alterations. This may be due to the inapplicability of settings alterations to a particular label (e.g., PDF document icons) and/or because a certain implementation does not want to promote simple setting alterations for a particular label (e.g., data back-up applications, security applications).

The following discussion first describes an operating environment, followed by techniques for gesture-enabled settings that may be employed in this environment, and proceeds with example user interfaces and apparatuses.

Figure 1:
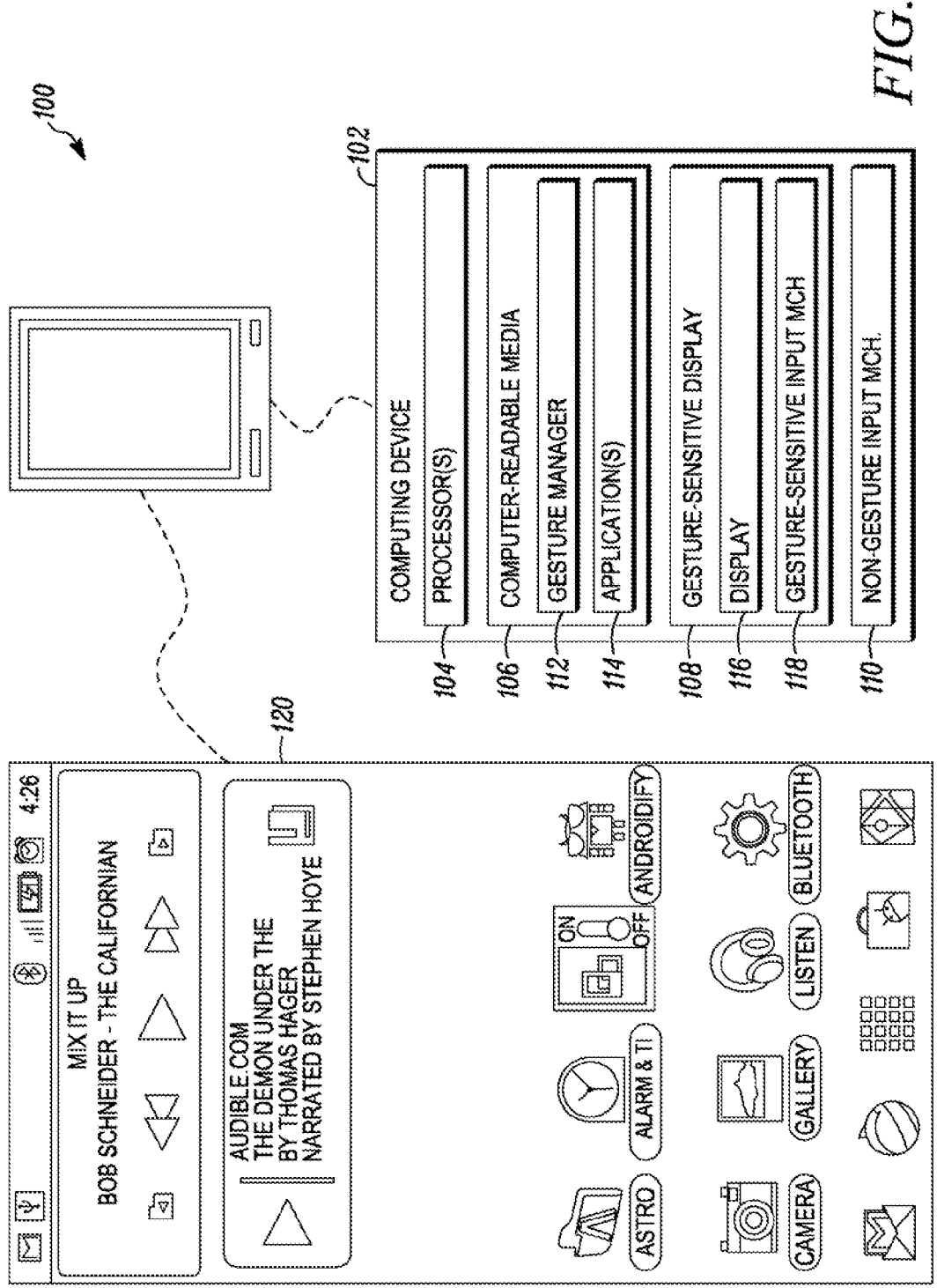
FIG. 1 illustrates an example environment in which techniques for gesture-enabled settings can be implemented.

FIG. 1 illustrates an example environment 100 in which techniques for gesture-enabled settings can be implemented. Example environment 100 includes a computing device 102 having one or more processor(s) 104, computer-readable media 106, a gesture-sensitive display 108, and optional non-gesture input mechanism(s) 110.

Computer-readable media 106 includes a gesture manager 112 and one or more applications, features, or capabilities 114 ("applications" 114) of the computing device 102. Application 114 is or includes an entity that has a setting capable of being altered, such as software, hardware, or firmware. Thus, an application may be a global positioning satellite (GPS) service with an option to turn on or off this service (even a hardware element enabling this service), a personal-area-network (PAN) transceiver with a setting to turn this transceiver on or off, an alarm-clock application with settings to set an alarm time or alarm type, a camera application with mode or flash settings, or a home-screen applet that displays an image with an option to change the displayed image, for example. Other examples include settings control of peripherals such as displays, input keyboards, or pointing mechanisms (such as mice, joysticks, and game controllers), speakers, microphones, printers, or scanners. Still other settings include battery and power management, network access, languages, fonts, and icons. With only the number and variety of possible settings listed above, a user could easily get frustrated or confused when trying to find and alter a particular setting.

Computing device 102 is shown as a smart phone having a gesture-sensitive display 108, which acts as both a display 116 and a gesture-sensitive input mechanism 118. Gesture-sensitive input mechanism 118 is capable of receiving gesture inputs, such as human-touch or stylus-touch gestures, as well as motion gestures not having a touch element, such as a motion-sensitive array, a micro-electro-mechanical systems (MEMS) inertial sensor, an accelerometer, and the like. Another type of gesture-sensitive input mechanism is an infrared sensor or video camera for detecting gestures (e.g., hand gestures) made in the near-vicinity of the computing device.

Non-gesture input mechanisms 110 can include keyboard buttons, a track ball, volume control buttons, a camera button, a power/standby button, voice commands, and the like. While not required, these or other non-gesture inputs may be received and responded to by the techniques described herein.

Furthermore, various types of computing devices, displays, and input mechanisms may also or instead be used, such as a personal computer having a monitor, keyboard, and mouse, a laptop with an integrated display and keyboard with touchpad, a cellular phone with a small integrated display and a telephone keypad plus navigation keys, or a tablet computer with an integrated touch-sensitive display (e.g., a touch screen and/or other touch-sensitive sensors capable of receiving gestures made proximal to the display). In some of these cases, a gesture is not made directly over a display but instead is received and shown over a display, such as a gesture received through a mouse or touch pad and shown on the display. Thus, a received gesture may be a mouse movement where the mouse pointer makes the motion over a label on the display. This may still be considered a gesture-sensitive display.

Environment 100 also illustrates an example home-screen interface 120, which shows various labels for applications 114. Home-screen interface 120 will be used to illustrate various techniques described below.

Figure 2:
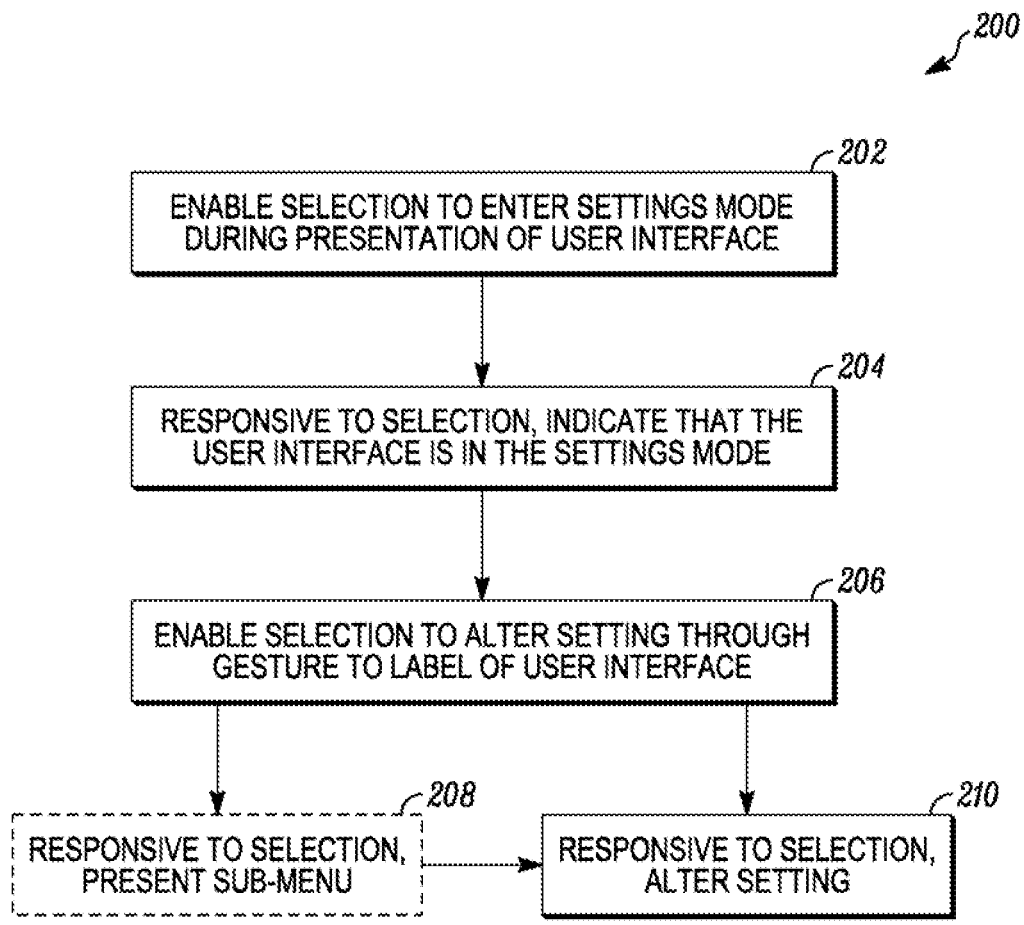
FIG. 2 illustrates example method(s) for gesture-enabled settings.

FIG. 2 illustrates example method(s) 200 for gesture-enabled settings. The order in which the method blocks are described is not intended to be construed as a limitation, and any number or combination of the described method blocks can be combined in any order to implement a method.

At block 202, selection is enabled to enter a settings mode during presentation of a user interface that has one or more labels representing one or more respective applications. In accordance with this description, a label can be an icon or other graphical element, a textual or numeric element, or combinations of these elements. This user interface can be of various kinds, such as a start menu, a home screen, a call-status screen, an application-selection interface, and others. By way of example, consider home-screen interface 120 of FIG. 1, which will be used as part of an ongoing example.

Selection can be enabled through a gesture made to gesture-sensitive display 108 of FIG. 1, though non-gestures may also be used, such as verbal or mechanical (e.g., button, key, etc.) controls. Thus, block 202 may enable a user to select to enter a settings mode for a currently-displayed interface through a touch gesture, mouse gesture, keypad or keyboard keypress, or by pressing both volume buttons on the side of a smart phone, to name just a few.

Figure 3:
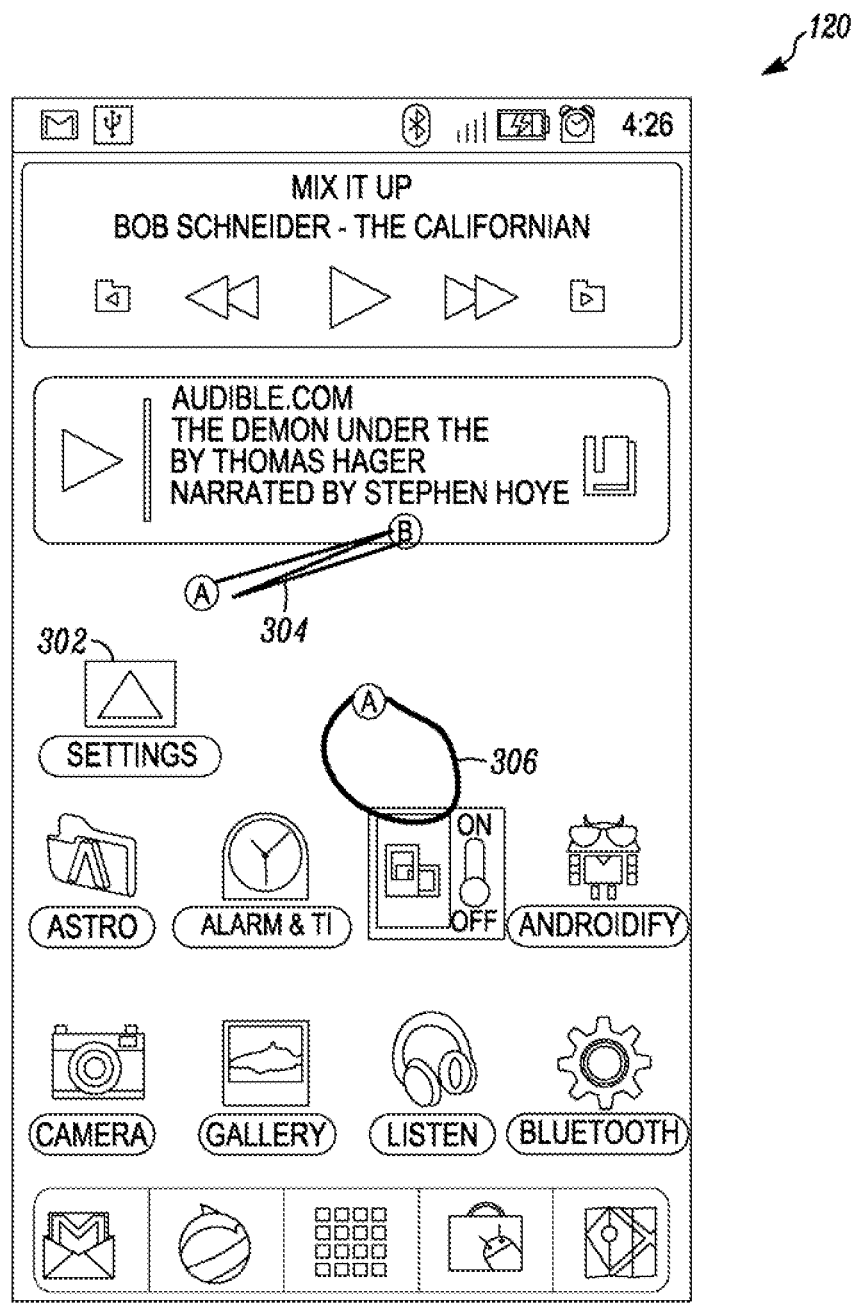
FIG. 3 illustrates an example home-screen interface.

By way of example, consider home-screen interface 120 as displayed in FIG. 3, which illustrates different example manners for enabling selection at block 202. First, note that FIG. 3 illustrates home-screen interface 120 having a selectable settings label 302. A user may select settings label 302, such as with a simple gesture, like a tap or press-and-hold over settings label 302. Second, a user may select to enter a settings mode with a non-simple gesture made to one, various, or any portion of home-screen interface 120. Non-simple gestures are generally those that are not often accidental and/or are dedicated to a particular function, such as non-linear and/or continuous but direction-changing gestures. For example, gesture manager 112 can enable a user to select, anywhere on home-screen interface 120, to enter the settings mode with a double back-and-forth gesture as shown at 304 (e.g., start at point A, move roughly to a point B, move back from point B roughly toward point A, and the move back again roughly to point B in one gesture) or a circular gesture as shown at 306 (e.g., start at point A, move roughly in a circular motion, and end roughly at point A). Also, a user may select a non-gesture input, like hot keys or key combinations on a keyboard or keypad (not shown). As another alternative, a user may provide audio input to activate the settings mode.

At block 204, responsive to receiving selection to enter the settings mode, the settings mode is indicated within the user interface. This indication that the settings mode has been entered can be shown without altering a layout or orientation of the user interface or labels in the user interface. Further, the same user interface can be used to alter settings; a second user interface, new screen, or other change can thus be avoided.

Figure 4:
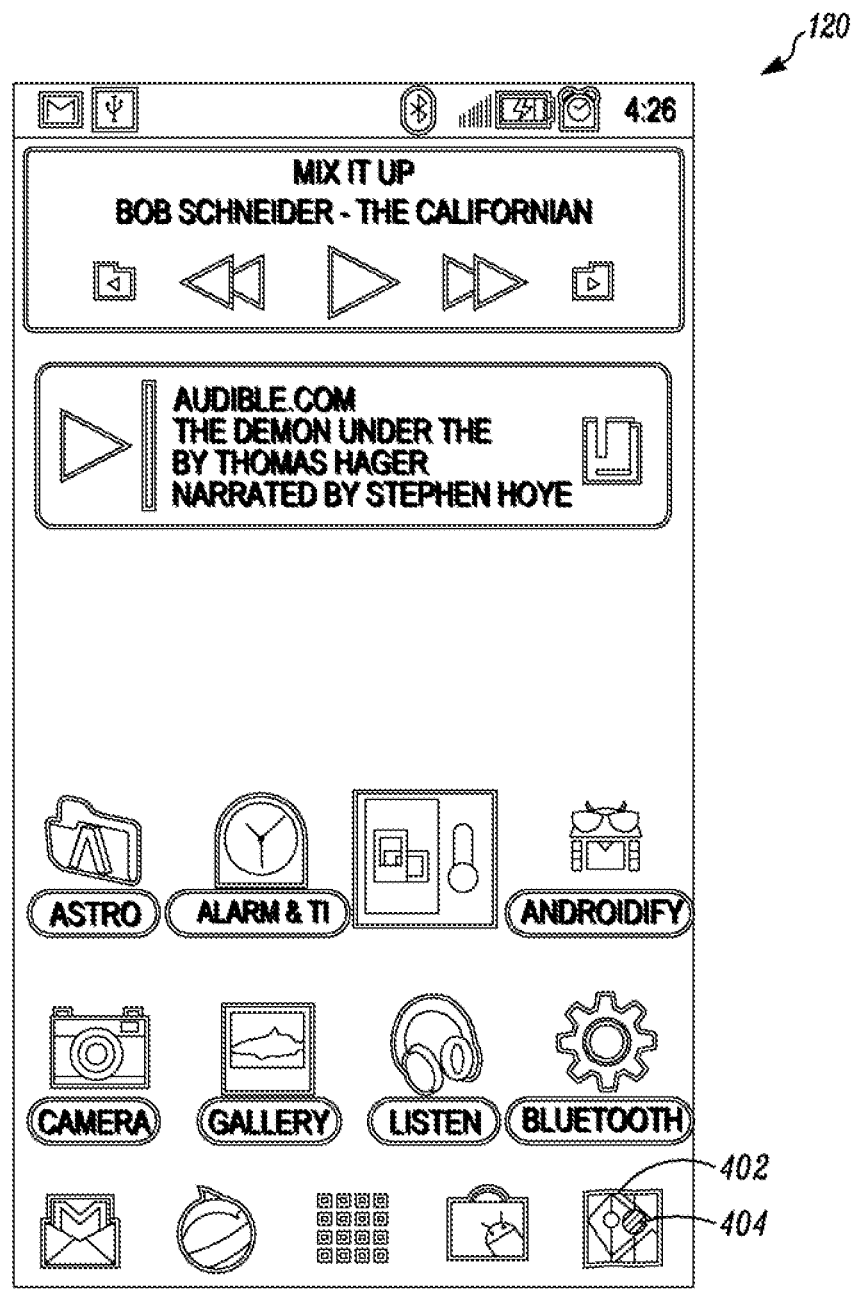
FIG. 4 illustrates the example home-screen interface of FIG. 3 but indicating that the home-screen interface is in a settings mode through watermarking the labels.
Figure 5:
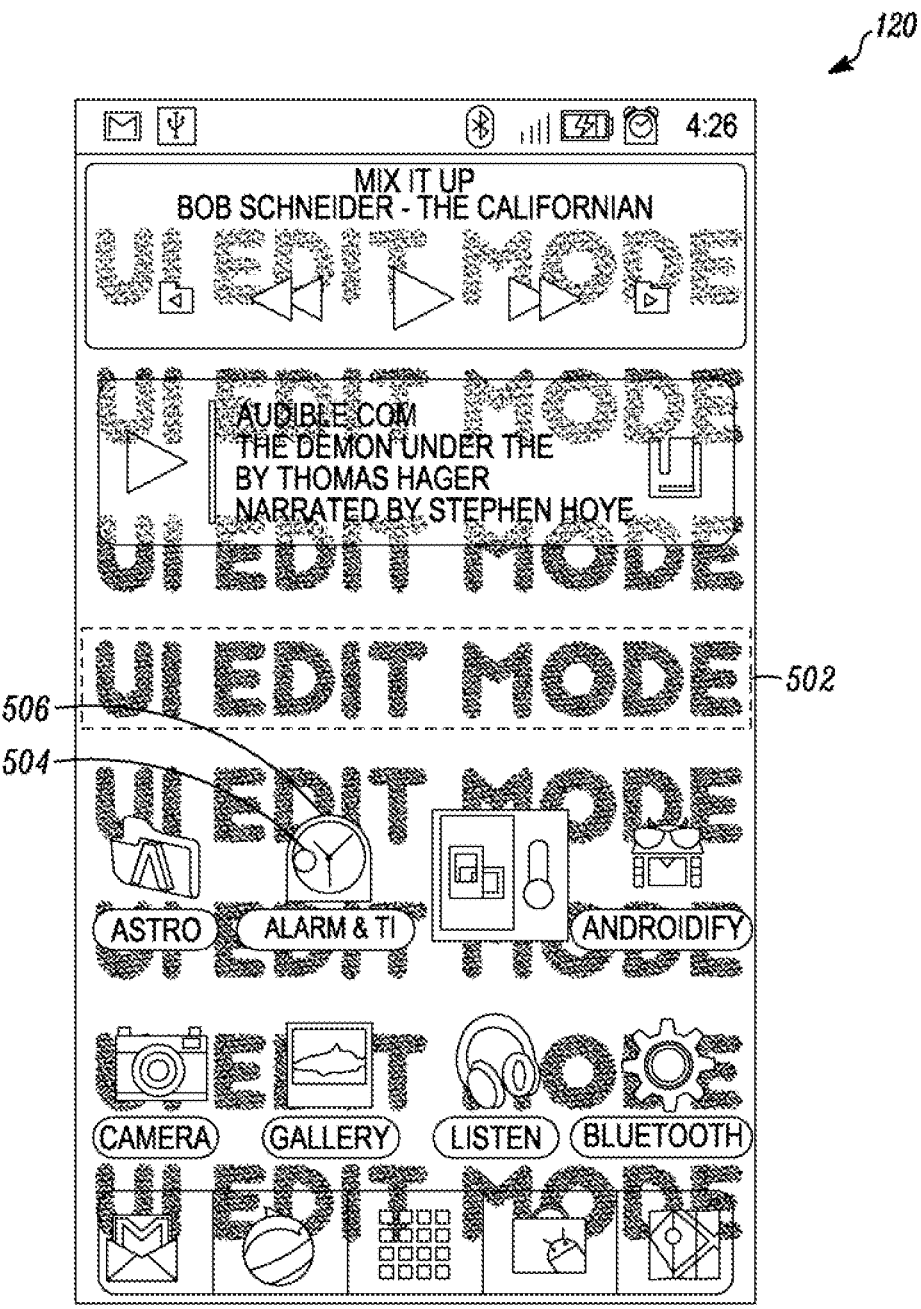
FIG. 5 illustrates the example home-screen interface of FIG. 3 but indicating that the home-screen interface is in a settings mode through watermarking a background of the interface.

Continuing the ongoing example, consider FIGS. 4 and 5. FIG. 4 illustrates user interface 120 with the settings mode indicated by individually watermarking one or more labels. FIG. 5 illustrates user interface 120 with the settings mode indicated by watermarking a background of the interface (shown with watermarked text "UI EDIT MODE" at 502). Note that in both examples the selectable labels remain, as well as their orientation and layout. This can aid a user because the user need not understand another screen, navigate a multi-level settings menu, search for labels, and the like. The user instead sees a variant of a user interface (here a home screen), with which the user is presumably familiar. Because most home screens are configured by a user to include almost all of the software applications that a user accesses frequently, this method and apparatus can be particularly useful when implemented in conjunction with a home screen.

While shown with watermarking labels or a background, gesture manager 112 may also or instead indicate the settings mode through changing colors of labels (e.g., from black to red), altering a font of labels (e.g., from normal to italics or bold), flashing or highlighting labels, adding a setting indicator over each label, creating a visual overlay for the user interface that is partially translucent, replacing a label with a variant of the label (e.g., by adding the word "settings"), and the like. As mentioned earlier, not all labels need to be altered, because not all related application may be conducive to simple setting alterations. In the examples of FIG. 4, however, all the icons shown have simple setting alterations available. Many of the applications shown in FIG. 4 allow audio volume settings, visual resolution settings, notification (alert) settings, toggle/cycle settings, and/or data settings. Of course, other settings are available for other applications.

For the ongoing example, note that a user has selected, through a non-simple gesture 304 or 306, to enter a settings mode, which gesture manager 112 shows with the same user interface architecture but indicated with watermarking each label. At this point, the user has utilized as few as one gesture or selection to enter the settings mode.

Returning to FIG. 2, at block 206, selection is enabled through a gesture made to the gesture-sensitive display on one or more of the labels presented in the user interface. Continuing the example used to describe blocks 202 and 204 above, at block 206 gesture manager 112 enables selection through a tap, tap-and-hold, or swipe gesture made to user interface 120 of FIG. 4 or FIG. 5. Here assume two example cases, one in which the user selects, with a simple tap gesture (though other gestures, including non-simple gestures, may instead be used), to alter a setting of a GPS satellite transceiver associated with a GPS and mapping application label 402 and selected with a tap gesture 404, both of FIG. 4. For a second example case, the user selects, with a simple tap-and-hold gesture 504 to alter a setting of an alarm clock application having an alarm label 506, both of FIG. 5.

Although not shown for the sake of simplicity, a timer may be used to time out of the settings mode if no label selection is made within a predetermined time period, and the flow would return to step 202 upon timeout. Consequently, the watermarking of the labels (in FIG. 4) or the watermarking of the background (in FIG. 5) would be removed, and the home screen would revert to normal (as shown in FIG. 3).

At block 208, responsive to selection of a selected label, a submenu to alter one or more settings for the application associated with the selected label can be presented. Gesture manager 112 can present the submenu within the user interface, adjacent to the selected label, having settings options corresponding only to the application associated with the selected label, or in other manners. Also not shown in order to keep the flow diagram clear, a timer may be used to time out of the settings sub-menu if no settings options selection is made within a predetermined time period, and the flow would return to either step 206 or step 202 upon timeout, depending on the implementation.

Figure 6:
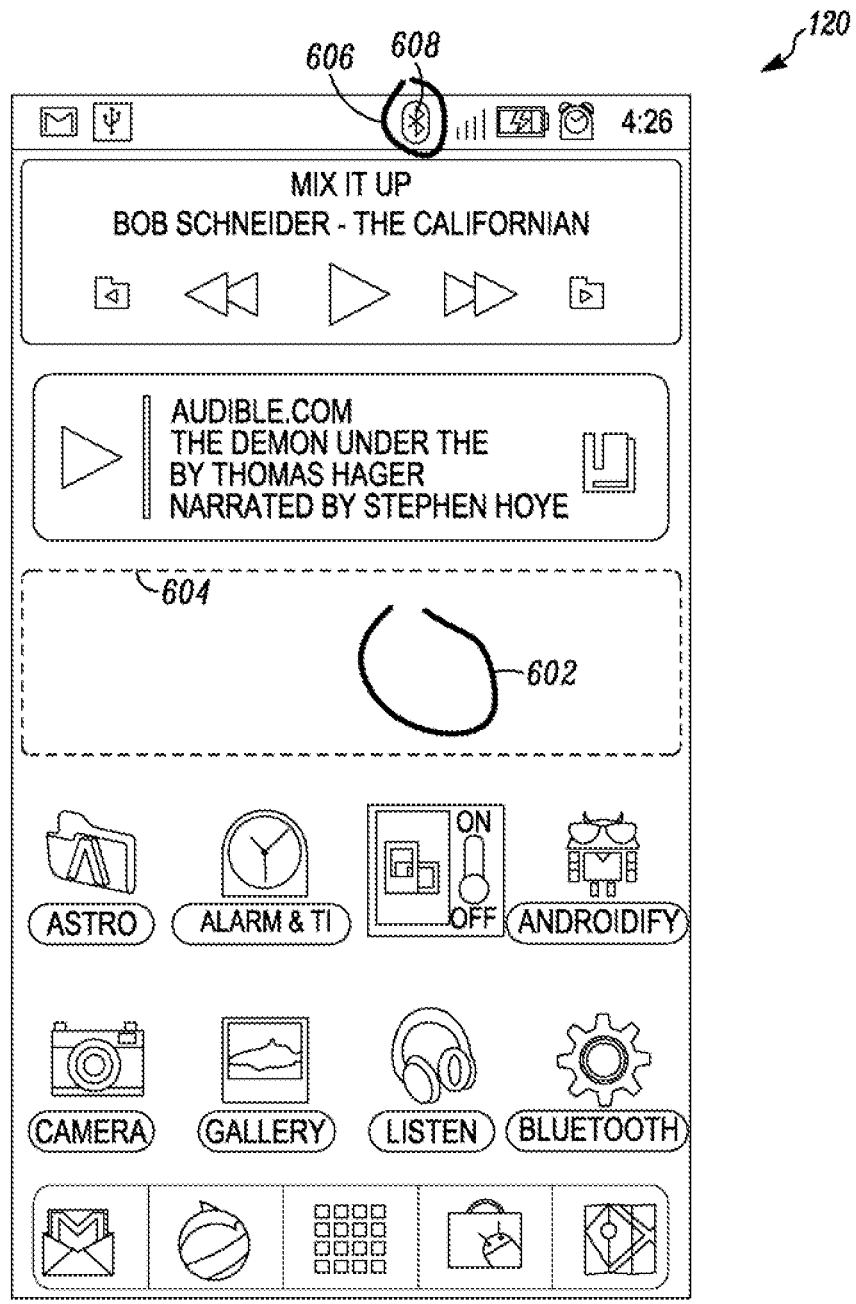
FIG. 6 illustrates the example home-screen interface of FIG. 3 when showing two different gestures received through the interface to alter two different settings.

By way of example, consider two further example selections. In one selection, non-simple gesture 602 of FIG. 6 selects to alter a setting for a home screen background application having selectable background area 604. In another, a simple tap-and-hold gesture 504 of FIG. 4 selects to alter a setting of an alarm clock application having an alarm label 506. In response to one of these selections, gesture manager 112 presents a submenu through which a user is enabled to alter a setting.

Figure 7:
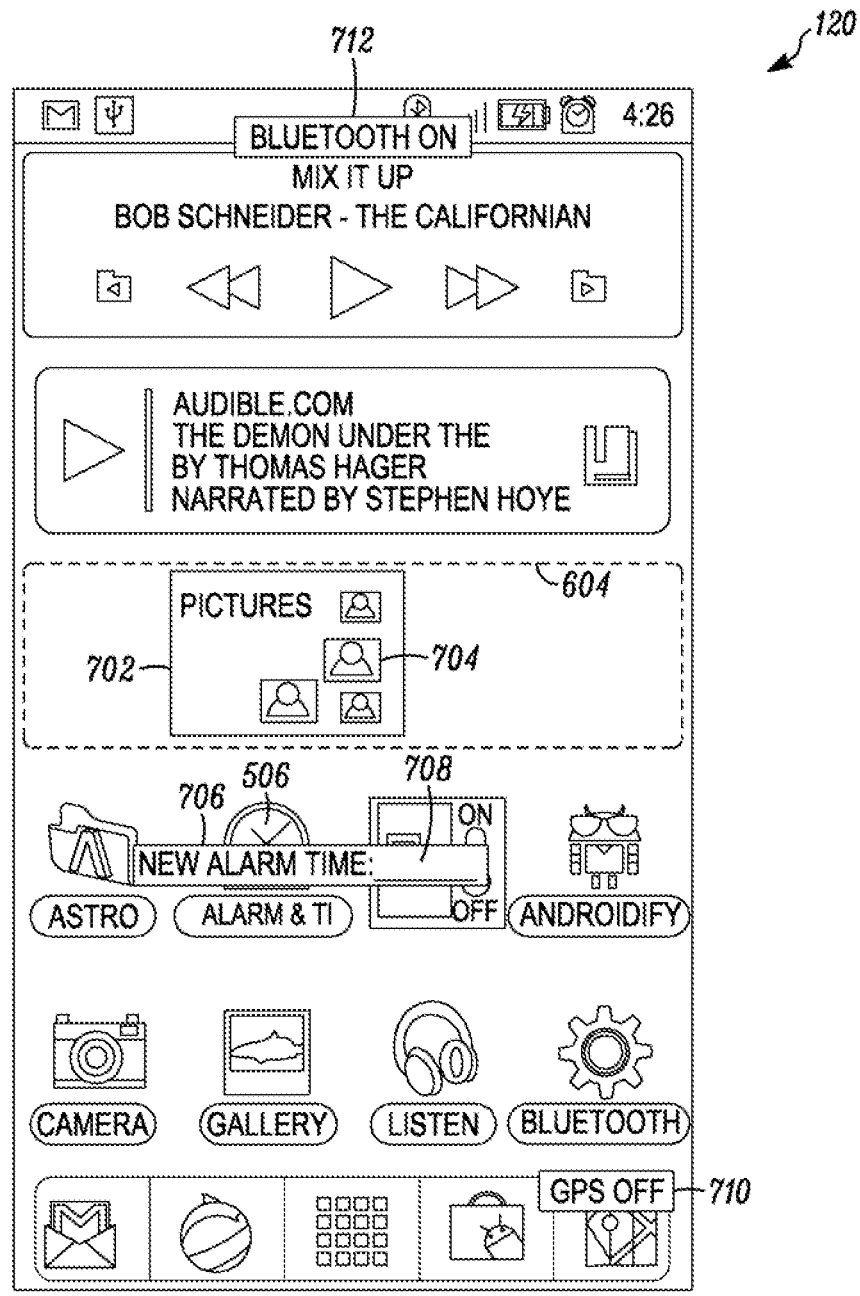
FIG. 7 illustrates the example home-screen interface of FIG. 3 when showing submenus and indicators.

For the home screen background application, gesture manager 112 presents an image selection submenu 702 having selectable images 704 (within or adjacent to area 604) as shown in FIG. 7. For the alarm clock application, gesture manager 112 presents an alarm settings submenu 706 having a data-entry field 708 in which to enter a new alarm time (shown adjacent to label 506). As these two examples illustrate, the techniques enable users to select to alter various settings and in various manners. Selectable images 704, for example, may be selected with a simple gesture, such as a tap on one of the images effective to replace a current home screen background image with the selected image. Data-entry field 708 permits entry of text to select a new alarm time. Thus, in some cases settings are selectable with a single gesture-based selection while in others the complexity of the settings does not lend itself to a single selection.

Following block 208 or directly following block 206, at block 210 a setting is altered responsive to a selection. The setting may be altered responsive to selection through a submenu as noted above. The setting may instead be altered responsive to a gesture to a label of the user interface at block 206. In some cases, gesture manager 112 alters a setting of an application in response to a gesture and without further user interaction or selection after receiving the gesture.

Consider again the case of simple gesture 404 made to GPS and mapping application label 402 of user interface 120 of FIG. 4. The user interface is in a settings mode, as indicated by watermarking of application labels in FIG. 4. In this settings mode and without altering a layout of the home screen, the techniques permit a user to select to toggle on or off a GPS satellite receiver by selecting and reselecting the label. Other implementations may allow cycling through multiple options (e.g., GPS ON and Assisted GPS ON, GPS ON and Assisted GPS OFF, GPS OFF and Assisted GPS ON, and GPS OFF and Assisted GPS OFF and returning to ON/ON if the user continues to reselect the label). In this case, gesture manager 112 enabled this setting alteration with as few as two simple gestures—a tap gesture to settings label 302 and a tap gesture 404 to GPS and mapping application label 402. The home screen layout does not change in this settings mode, so the user does not have to visually (re)scan the screen to find the "locations setting" submenu to access the GPS satellite receiver control setting.

While block 206 is shown following block 204, method 200 may instead start with block 206. Consider, for example, a case where gesture manager 112 enables selection to alter a setting directly through user interface 120 as shown in FIG. 3 and without a prior selection to enter a settings mode. In this case, gesture manager 112 enables a user to select to alter a setting through a non-simple gesture made substantially over or around the label associated with the application for which altering a setting is desired. This is shown with two different examples in FIG. 6, namely a non-simple gesture 606 used to select to alter (toggle on or off) a setting for a personal-area-network (PAN) application having a Bluetooth™ application icon 608 and non-simple gesture 602 used to select to alter a setting for a home screen background application (e.g., wallpaper) through selectable background area 604. Note that in these cases a user has made only one gesture to select to alter a setting.

In either case, however, the techniques may proceed to alter the setting or present a sub-menu enabling further settings option selection by the user. As feedback, a transient pop-up message, confirmation tone, or haptic feedback may be provided to acknowledge to the user that the desired setting change has been made.

If the user has inadvertently changed a setting, a simple or non-simple gesture can be used to "undo" the settings change. A simple gesture can be pressing a "back" key or swiping backwards, which a non-simple gesture can be drawing a counterclockwise circle or spiral.

As another example, gesture manager 112 may present a setting indicator in the user interface graphically proximate the selected label indicating a setting that can be selected, such as by indicating that upon selection the GPS receiver will turn off, as shown at "GPS OFF" indictor 710, or that upon selection the PAN transceiver will turn on, as shown with "Bluetooth ON" indicator 712, both of FIG. 7. These indicators can be presented as part of block 204 or otherwise.

Figure 8:
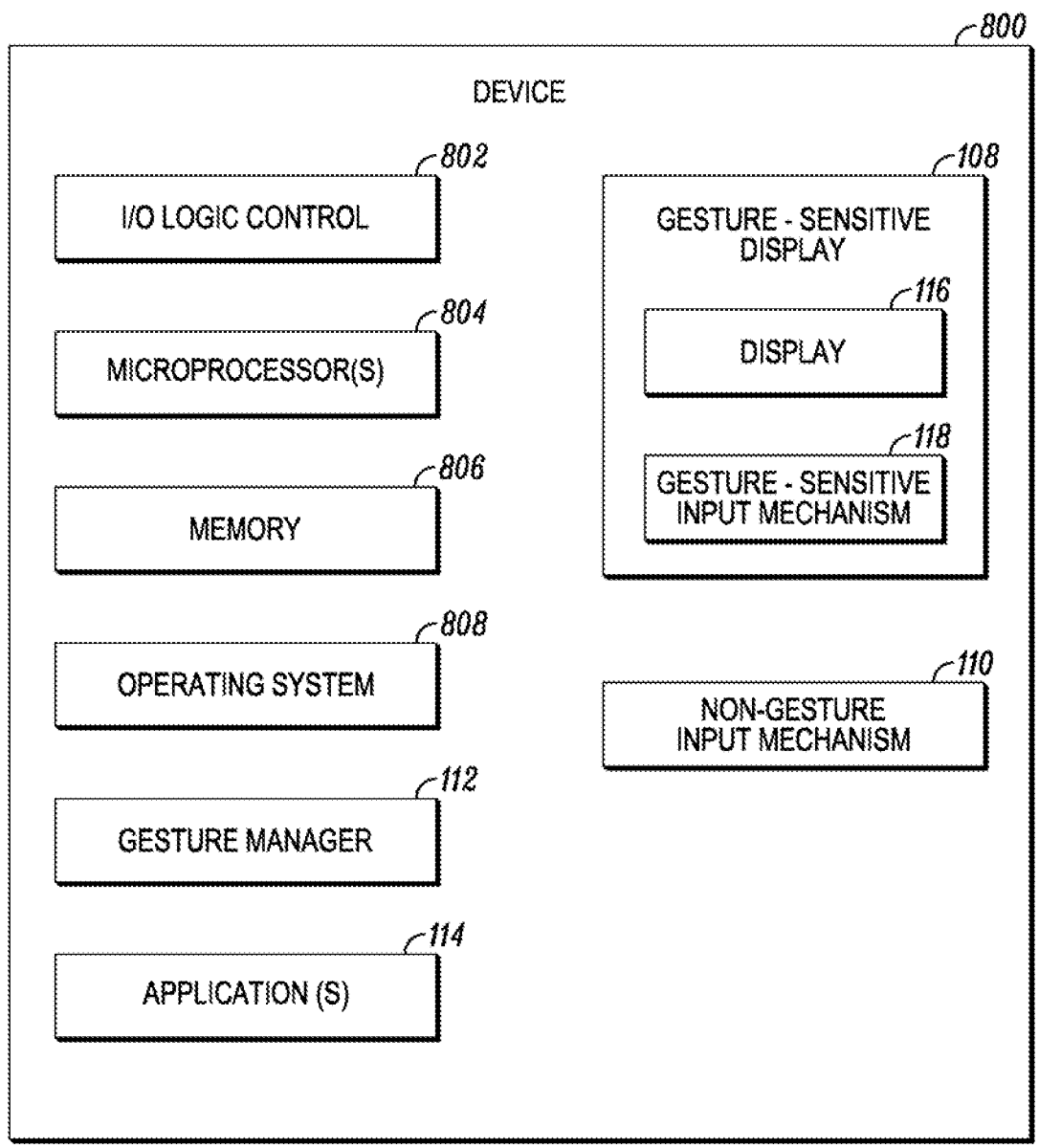
FIG. 8 illustrates various components of an example apparatus that can implement techniques for gesture-enabled settings.

FIG. 8 illustrates various components of an example device 800 including gesture manager 112, application(s) 114, gesture-sensitive display 108 having display 116 and gesture-sensitive input mechanism 118, and non-gesture input mechanism 110. The components of device 800 can be implemented in hardware, firmware, software, and/or any suitable combination thereof and as described with reference to any of the previous FIGS. 1-7.

Example device 800 can be implemented in a fixed or mobile electronic device being one or a combination of a media device, computing device (e.g., computing device 102 of FIG. 1), television set-top box, video processing and/or rendering device, appliance device (e.g., a closed-and-sealed computing resource, such as some digital video recorders or global-positioning-satellite devices), gaming device, electronic device, in-vehicle computing platform, and/or workstation.

Example device 800 can be integrated with electronic circuitry, a microprocessor, memory, input-output (I/O) logic control, communication interfaces and components, other hardware, firmware, and/or software needed to run an entire device. Example device 800 can also include an integrated data bus (not shown) that couples the various components of the computing device for data communication between the components.

Example device 800 includes various components such as an input-output (I/O) logic control 802 (e.g., to include electronic circuitry) and microprocessor(s) 804 (e.g., microcontroller or digital signal processor). Example device 800 also includes a memory 806, which can be any type of random access memory (RAM), a low-latency nonvolatile memory (e.g., flash memory), read only memory (ROM), and/or other suitable electronic data storage.

Example device 800 can also include various firmware and/or software, such as an operating system 808, gesture manager 112, and applications 114, which can be computer-executable instructions maintained by memory 806 and executed by microprocessor 804. Example device 800 can also include other various communication interfaces and components, wired or wireless LAN (WLAN) or PAN components, cellular transceivers, other hardware, firmware, and/or software.

Other example capabilities and functions of these components are described with reference to elements shown in FIG. 1 and illustrations of FIGS. 3-7. These components, either independently or in combination with other components or entities, can be implemented as computer-executable instructions maintained by memory 806 and executed by microprocessor 804 to implement various embodiments and/or features described herein. These components may also be provided integral with other components of device 800, such as integrated with gesture manager 112. Alternatively or additionally, any or all of these components can be implemented as hardware, firmware, fixed logic circuitry, or any combination thereof that is implemented in connection with the I/O logic control 802 and/or other signal processing and control circuits of example device 800.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    outputting, by a computing device, for display, a user interface including a plurality of labels, wherein each label of the plurality of labels is associated with a respective application of a plurality of applications of the computing device;
    receiving, by the computing device, an indication of a first user input to enter a settings mode;
    responsive to receiving the indication of the first user input, outputting, by the computing device, an indication that the user interface is in a settings mode without altering respective positions of the plurality of labels;
    receiving, by the computing device, an indication of a second user input to select a particular label of the plurality of labels;
    responsive to receiving the indication of the second user input, outputting, by the computing device, for display, an updated user interface including settings information for the respective application associated with the particular label without altering the respective positions of the plurality of labels; and
    responsive to receiving an indication of a third user input to alter a setting of the respective application associated with the particular label, altering the setting for the respective application associated with the particular label.

2. The method as recited in claim 1, wherein the updated user interface includes a setting indicator graphically proximate to the particular label, the setting indicator identifying a particular setting that will be altered responsive to re-selection of the particular label.

3. The method as recited in claim 1, wherein the updates user interface includes a setting indicator graphically proximate to the particular label, wherein the setting indicator indicates that a particular setting will cycle responsive to re-selection of the particular label.

4. The method as recited in claim 1, wherein the indication that the user interface is in the settings mode includes a translucent watermark visually positioned one or more of the plurality labels without altering a layout or orientation of the plurality labels.

5. A method comprising:
    outputting, by a computing device, for display, a user interface including a plurality of labels, wherein each label of the plurality of labels is associated with a respective application of the computing device;
    receiving, by the computing device, an indication of a first user input to enter a settings mode;
    responsive to receiving the indication of the first user input, outputting, by the computing device, an indication that the user interface is in a settings mode without alerting respective positions of the plurality of labels;
    receiving, by the computing device, an indication of a non-simple gesture performed over or around a particular label from the plurality of labels;
    responsive to receiving the indication of the non-simple gesture, outputting, by the computing device, for display, an updated graphical user interface including a submenu that enables a user-selection to alter a setting of the respective application associated with the particular label;
    receiving, by the computing device, an indication of a second user input to select at least a portion of the submenu; and
    responsive to receiving the indication of the second user input, altering, by the computing device, the setting of the respective application associated with the particular label.

6. The method as recited in claim 5, wherein the non-simple gesture comprises a circular gesture located around the particular label.

7. The method as recited in claim 5, wherein the non-simple gesture comprises a back-and-forth gesture located over the particular label.

8. The method as recited in claim 5, wherein the submenu is presented visually and geographically proximate the particular label and includes settings of only the application associated with the particular label.

9. The method as recited in claim 5, wherein the user interface is a start menu, home screen, or application-selection interface that is not in a settings mode.

10. An apparatus comprising:
    one or more processors;
    a display; and
    one or more computer-readable media having computer-readable instructions thereon that, when executed by the one or more processors:
        output, for display by the display, a user interface including one or more labels, wherein each label of the one or more labels is associated with a respective application of a plurality of applications;
        receive an indication of a first user input to enter a settings mode;

responsive to receiving the indication of the first user input, output an indication that the user interface is in a settings mode without alerting respective positions of the plurality of labels;

receive an indication of a second user input to select a particular label of the one or more labels;

responsive to receiving the indication of the second user input, output, for display by the display, an updated user interface including settings information for the respective application associated with the particular label without altering respective positions of the one or more labels; and responsive to receiving an indication of a third user input to alter a setting of the respective application associated with the particular label, alter the setting for the respective application associated with the particular label.

11. The apparatus as recited in claim 10, wherein the alteration to the setting further turns on, turns off, or alters a service of: a personal-area-network transceiver, a flash of a camera application, a peripheral input keyboard, a peripheral pointing mechanism, a peripheral speaker, a peripheral microphone, a peripheral printer, a peripheral scanner, a peripheral or non-peripheral battery, a power management application, or a network.

12. The apparatus as recited in claim 10, wherein the first user input comprises one or more of:

a manual or mechanical control; or a non-simple gesture within detected by the display.

13. The apparatus as recited in claim 10, wherein the updated user interface includes an at least partially translucent overlay visually positioned over at least one of the one or more labels, the overlay indicating that the user interface is in a settings mode.

14. The apparatus as recited in claim 10, wherein the updated graphical user interface further includes a submenu comprising settings of only the respective application of the selected label.

15. The apparatus as recited in claim 10, wherein the updated graphical user interface includes an altered appearance of at least one label of the one or more labels or a setting indicator proximate to at least one of the one or more labels.

16. The method of claim 1, wherein altering the setting changes one or more of an audio volume setting, a visual resolution setting, an alert setting, an alarm setting, a toggle setting for enabling and disabling functionality provided by the particular application, or a data setting of the respective application associated with the particular label.

17. The method of claim 5, wherein altering the setting changes one or more of an audio volume setting, a visual resolution setting, an alert setting, an alarm setting, a toggle setting for enabling and disabling functionality provided by the particular application, or a data setting of the respective application associated with the particular label.

18. The apparatus of claim 10, wherein altering the setting changes one or more of an audio volume setting, a visual resolution setting, an alert setting, an alarm setting, a toggle setting for enabling and disabling functionality provided by the particular application, or a data setting of the respective application associated with the particular label.

* * * * *